United States Patent Office 3,007,879
Patented Nov. 7, 1961

3,007,879
STABILIZED GUMS AND METHODS OF MAKING THEM
Wesley A. Jordan, Minneapolis, Minn., assignor to General Mills, Inc., a corporation of Delaware
No Drawing. Filed Feb. 14, 1958, Ser. No. 715,209
4 Claims. (Cl. 252—352)

The present invention relates to the stabilizing of high viscosity aqueous dispersions of gums and more particularly to compositions and methods for the production of stable dispersions of guar gums.

Guar gum is a member of the family of substances known as galactomannan gums. This polysaccharide, when dispersed in water, yields a hydrophilic colloid. Such colloids or dispersions, often referred to as sols, have a wide variety of industrial uses, particularly when made in proportions providing thick, viscous solutions, e.g. having a viscosity of 2000 to 7000 cps.( centipoises). This guar gum is used as a thickener for food products, textile print pastes, adhesives, water-base paints, as a viscosity stabilizer for emulsions, and in drilling fluids as a water loss control agent. In many such applications, the stability of the guar sols against viscosity change is of prime importance.

Previous attempts to stabilize the viscosity of these dispersions have not always proven satisfactory, particularly where stability over a substantial number of hours is desired. Such prior efforts have included heating the sols, heating the dry gum, roasting the endosperm of the beans during processing, and treating with $SO_2$, peracetic acid, or other acidic substances.

With these problems and disadvantages of the prior art in view, it is one object of the present invention to provide an improved composition for a stabilized high viscosity gum dispersion.

Another object is the provision of an improved method of mixing such dispersions.

A further object is the provision of aqueous dispersions of guar gum which maintain a stable high viscosity over a substantial period of time.

Still another object is the provision of improved dry compositions which can be used to produce stable high viscosity dispersions of guar gum.

Other objects and advantages will be apparent from the following specification, in which certain preferred embodiments of the invention are described.

According to the present invention it has been found that improved stability of aqueous dispersions of gums such as guar gum can be obtained by including in such dispersions a suitable metallic ion inactivating agent. For this agent one may use a suitable chelating agent or a suitable metallic ion insolubilizing agent. The effective chelating agents are those having a metal-sequestering action and particularly a sequestering effect on such metals as iron. Those chelating agents which are preferred for this use include the polybasic acids, such as oxalic, citric, and tartaric acids, as well as synthetic sequestering agents such as N,N,N',N'-tetrakiscarboxymethylethylenediamine. An effective metallic ion inactivating agent, which does not chelate, but insolubilizes the iron, for example, is orthophosphoric acid.

These inactivating agents have been found to produce improved stabilizing effects which are much longer lasting and also much less sensitive to variations in the pH of the dispersions than in the case of prior art sols. Particularly desirable results are obtained, however, when the acidity of the dispersion is maintained in the pH range from about 4.0 to about 6.5. Citric acid, a tribasic acid, has been found to give superior stabilizing results, and to provide a pH in this general range with normally available guar gums and water supplies without the necessity of otherwise adjusting the pH.

According to a further feature of the invention, it is important to include these metallic ion insolubilizing or chelating agents in the desired dispersions at the time such dispersions are first prepared. In fact, the stabilizing agent is preferably added to the water before the guar gum hydrates. In this way, the stabilizer can effectively forestall any changes of a viscosity-lowering nature which might otherwise take place as soon as the guar gum is dispersed in the water.

The preferred form of the invention further contemplates the provision of a dry composition including both the gum and the stabilizing agent, for convenient use in preparation of desired dispersions. One way to make such a dry composition is by addition of the stabilizing agent in dry powdered form to the dry powdered or comminuted guar gum. Another way is to spray a solution of the stabilizing agent on air-suspended dry powdered guar gum and subsequently to dry the mixture. Another method is to dissolve the stabilizing agent in some of the water used in processing the gum-bearing fractions of the guar bean and then continuing the normal processing of the gum to obtain a dry powdered product. Thus a dry composition is provided which absolutely insures the effective presence of the stabilizing or metallic ion inactivating agent when the dispersion is first prepared and which helps protect the dry gum against possible degradation of its viscosity effects through premature addition of moisture to the gum. Stabilizing agents of the type described above which have the further property of stability in dry powdered form at normal environmental temperatures are thus suitable for use in these dry compositions.

The aqueous dispersions which are stabilized according to the present invention should normally include from about 0.1% to about 5.0% of guar gum, based on the total weight of water and gum. When citric acid is used as the stabilizer, amounts as low as about 0.25% and as high as about 2.0%, based on the weight of the gum, have been found effective. Amounts substantially below 0.25% are less effective and in one case the use of only 0.018% citric acid did not preserve the viscosity of the sol. While higher amounts may be unnecessary in most normal situations, amounts above 2% do appear to stabilize the sols and may be necessary in cases where there is unusually high metal ion concentration. When metal ion inactivating agents other than citric acid are used, the relative amounts should preferably be adjusted within a range adapted to produce an inactivating effect as nearly equivalent as possible to that of the above quantities of citric acid.

While exact reasons for the effectiveness of the methods and compositions of the present invention are difficult to establish, it is my belief that the degradation of high viscosity guar sols is due to both bacterial and enzyme activity. While some prior attempts at stabilization have tended to arrest such activity under certain conditions, I believe that prior workers have failed to recognize the possibility that enzyme activity in guar sols is triggered by metal ions, particularly iron.

I have noted that available grades of guar gum normally contain from 0.002% to 0.007% of iron and that the enzymatic activity in guar dispersions appears to vary in direct ratio to the amount of soluble iron present. I believe that the use of chelating agents having a metal-sequestering effect, and particularly an iron-sequestering effect, and the use of metallic ion insolubilizing agents such as orthophosphoric acid thus makes it possible to tie up the iron or other metals present in guar dispersions and hence prevent such metals from triggering further enzymatic activity.

Even if attempts are made by special treatment of the gum, as by heat or acid substances, to arrest the bacteriological and enzymatic activity, the iron or other metals will normally still be present in the guar dispersion. And there is always the possibility that the water or equipment used in preparing the dispersion will introduce further traces of metal, as well as some of the bacteria or molds which can provide sources of enzymatic activity. I believe the effective inactivating of these metals by the chelating agents and metallic ion insolubilizing agents recommended as stabilizers according to the present invention effectively prevents the triggering of enzymatic activity which might impair the desired viscosity of the dispersions.

Regardless of the correctness of my above theory, however, the fact remains that aqueous gum dispersions prepared according to the methods and compositions described herein have been found to maintain effective high viscosities over much longer periods of time than dispersions made by prior methods and compositions.

The invention will be further described by means of the following examples which illustrate specific embodiments of the methods, compositions and effects involved in the practice of this invention:

In the first five following examples, a sample of guar gum was treated in various ways with different chelating substances and the effect on 1% sols made from the treated gums was measured. The guar gum was one which developed 2650 cps. viscosity as a 1% sol at 25° C. after 3 hours. This was the maximum viscosity obtainable. After 3 hours, this viscosity dropped off, reaching 1800 cps. in 24 hours, 1300 cps. in 40 hours, and 450 cps. in 48 hours.

*Example 1*

In this first example, 396 parts by weight of the guar gum was dry blended with 4 parts by weight of dry powdered citric acid. From this dry composition a 1% sol was made (i.e. a dispersion containing 1% of the dry composition, based on the total weight of water, citric acid and guar). This aqueous dispersion developed a viscosity of 2650 cps. at 25° C. in 3 hours, and the viscosity remained at this level more than 96 hours. The stabilized sol was tested as a flocculant for slime and found to be fully satisfactory.

*Example 2*

To 495 parts by weight of distilled water was added 0.025 part by weight of citric acid in a glass container. 5 parts by weight of the guar gum was then added and dispersed in the solution. After 3 hours the viscosity at 25° C. was 2650 cps. and the viscosity remained at this level more than 96 hours.

*Example 3*

To 495 parts by weight of distilled water was added 0.025 part of oxalic acid. After the acid was dissolved, 5 parts of untreated guar gum was dispersed in the solution. After 3 hours the viscosity was 2650 cps. and the viscosity remained at this level after 48 hours. By contrast, a 1% sol of the same guar in distilled water, without other additives, exhibited a viscosity of 2650 cps. in 3 hours, but dropped to 450 cps. after 48 hours.

*Example 4*

To 495 parts by weight of distilled water was added 0.018 part of citric acid. 5 parts of the guar gum was then dispersed in this solution. After 3 hours the viscosity of the dispersion was 2650 cps. at 25° C. and after 96 hours the viscosity was the same.

*Example 5*

To 495 parts by weight of distilled water was added 0.0125 part of citric acid. 5 parts of guar gum was then dispersed in this solution to form a first sol. The pH of this first sol was 5.8.

A second sol was then made at 1% concentration using only the guar and distilled water.

A third sol was made like the second, and was then treated by adding $SO_2$ gas to adjust the pH to 5.6. The following table shows the effective viscosities of the three dispersions after various time periods:

|  | Viscosity at 25° C. after— | | |
|---|---|---|---|
|  | 3 hrs., cps. | 24 hrs., cps. | 48 hrs., cps. |
| Sol No. 1 | 2,650 | 2,650 | 2,650 |
| Sol No. 2 | 2,650 | 1,300 | 450 |
| Sol No. 3 | 2,650 | 2,275 | 1,200 |

This example indicates that, while acid treatments (No. 3) may provide some improvement in viscosity characteristics over the completely untreated dispersions (No. 2), the sol (No. 1) treated with a stabilizing agent of the type described herein and having a pH within the range specified in this application exhibits outstanding stability in its viscosity characteristics over a relatively long period of time.

*Example 6*

0.037 part by weight of orthophosphoric acid was mixed with 495 parts of distilled water. To this mixture was added 5 parts of guar gum. After 4 hours the viscosity was 2650 cps. and the pH was 4.8. A second sol was made by mixing 5 parts of guar gum with 495 parts of water. The viscosity of this sol after 4 hours was 2650 cps. A third sol was made like the second, but to it was added sufficient HCl to adjust the pH to 4.9. The viscosity after 4 hours was 2650 cps. The following is a table comparing the viscosities of these three sols after 24 hours:

|  | pH of Sol | Viscosity after— | |
|---|---|---|---|
|  |  | 4 hrs., cps. | 24 hrs., cps. |
| Sol No. 1 | 4.8 | 2,650 | 2,650 |
| Sol No. 2 | 6.8 | 2,650 | 1,800 |
| Sol No. 3 | 4.9 | 2,650 | 2,200 |

The above example shows that a sol having a pH of 4.9 resulting from the use of an acidic agent which does not inactivate the iron ions still loses viscosity as compared to a sol having a similar pH resulting from the use of an acidic agent which will inactivate the iron ions.

*Example 7*

As further examples of the preparation of dry compositions suitable for subsequent preparation of stable high viscosity aqueous guar dispersions, the following dry mixtures were prepared:

|  | Parts by Weight | | |
|---|---|---|---|
|  | Mix 1 | Mix 2 | Mix 3 |
| Guar Gum | 99 | 98 | 95 |
| Oxalic Acid | 1 | 2 |  |
| Tartaric Acid |  |  | 5 |

From each of the above dry mixes, 1% sols were prepared and checked for viscosity stability. In each case the viscosity after 24 hours was substantially higher than the viscosity of an untreated sol of the same gum.

In view of the principles set forth herein, we have shown some of the ways of carrying out the present invention and some of the equivalents which are suggested by these disclosures.

What is claimed is:

1. A dry powdered composition for the production of stable high viscosity aqueous dispersions of guar gum, said composition consisting essentially of guar gum and an iron-ion inactivating agent selected from the group consisting of citric, oxalic, tartaric, and orthophosphoric acids, said iron-ion inactivating agent being employed in a quantity of from 0.25% to 5% by weight based on the weight of the guar gum.

2. A dry powdered composition according to claim 1 in which the iron-ion inactivating agent is citric acid and constitutes from 0.25% to 2% based on the weight of the guar gum.

3. The method of stabilizing an aqueous dispersion of guar gum which comprises first mixing with water an iron-ion inactivating agent selected from the group consisting of citric, oxalic, tartaric, and orthophosphoric acids in an amount of from 0.25% to 5% based on the weight of guar gum used, and then dispersing in said solution from about 0.1% to about 5% guar gum based on the total weight of the dispersion.

4. A method according to claim 3 in which the resulting dispersion has a pH from about 4.0 to 6.5.

References Cited in the file of this patent

UNITED STATES PATENTS

| | | |
|---|---|---|
| 1,448,847 | Kaiser | Mar. 20, 1923 |
| 2,644,765 | Frisch et al. | July 7, 1953 |
| 2,674,523 | McDonald et al. | Apr. 6, 1954 |
| 2,767,167 | Opie et al. | Oct. 16, 1956 |
| 2,844,547 | Sheldon | July 22, 1958 |

OTHER REFERENCES

"Organic Metal Co-ordinate Compounds," article by Bergy in Amer. J. of Pharm. 126: June 6, 1954, pp. 208, 209, 211.